UNITED STATES PATENT OFFICE.

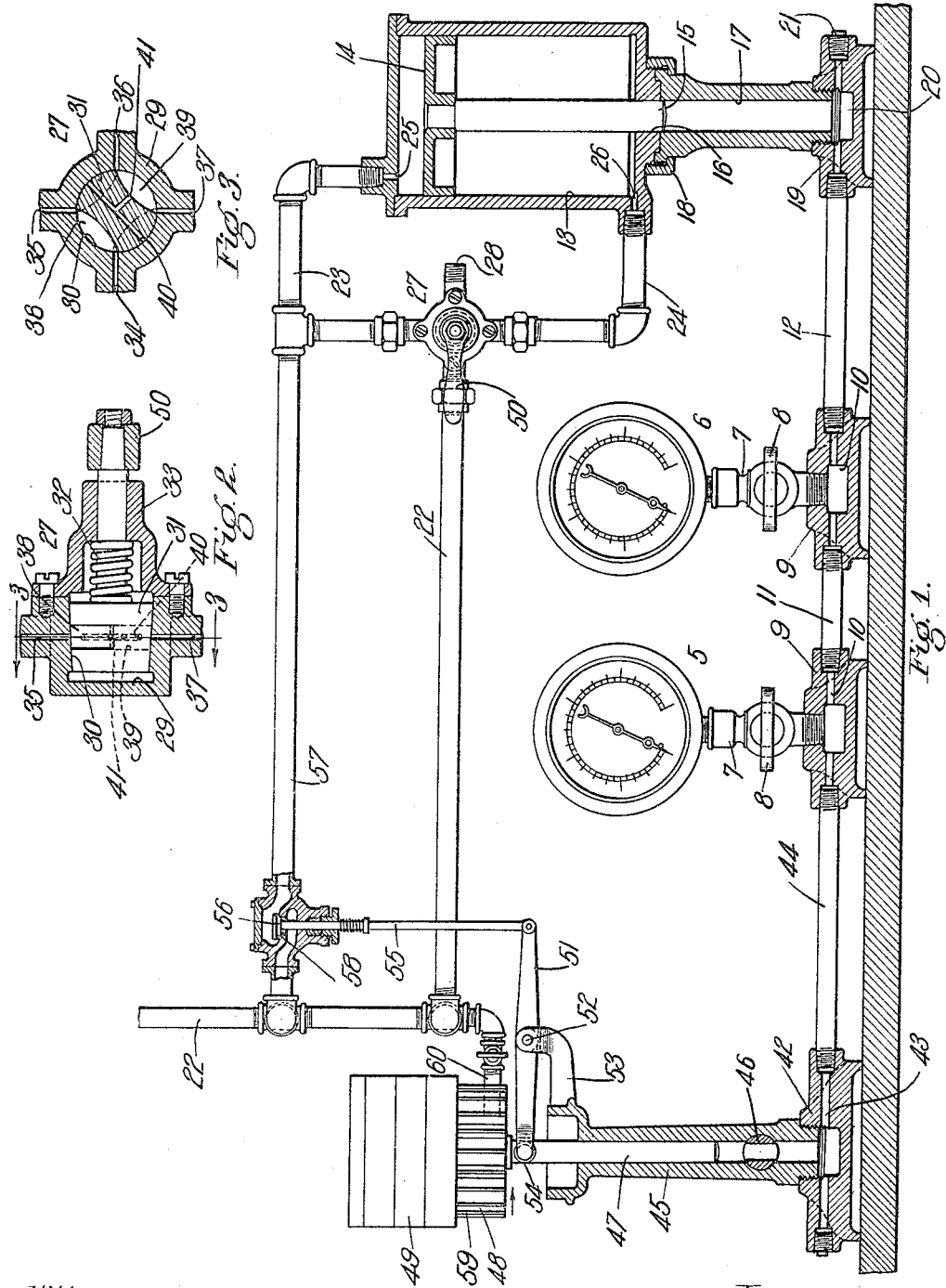

AUSTIN B. COLLETTE, OF EVERETT, MASSACHUSETTS, ASSIGNOR TO AMERICAN STEAM GAUGE & VALVE MANUFACTURING CO., A CORPORATION OF MASSACHUSETTS.

TESTING APPARATUS.

1,134,316.   Specification of Letters Patent.   Patented Apr. 6, 1915.

Application filed September 12, 1913. Serial No. 789,564.

*To all whom it may concern:*

Be it known that I, AUSTIN B. COLLETTE, a citizen of the United States, residing at Everett, in the county of Middlesex and State of Massachusetts, have invented new and useful Improvements in Testing Apparatus, of which the following is a specification.

This invention relates to testing apparatus particularly adapted for testing pressure and vacuum gages, safety valves and the like.

The common method of testing gages is to first test a master gage by means of what is known as a dead weight gage tester which consists of a cylinder having a plunger arranged to reciprocate therein, which in turn is adapted to support a series of weights, each weight being the equivalent of five pounds registered on the gage. The gage to be tested and the cylinder of the dead weight testing apparatus are connected together by passages into which air or liquid is forced under pressure for the purpose of elevating the plunger carrying said weights until said plunger is free to be rotated in said cylinder, or in other words, floats therein and when in such a position the hand of said gage is set to correspond to the amount of weight sustained by said plunger. Another weight is then added to said plunger which causes said plunger to settle, necessitating the application of still more pressure to the fluid contained in the cylinder in order to lift said additional weights free of said cylinder. This operation is continued until the hand thereof has been adjusted to register correctly with the entire graduations on said gage.

A hand pump or a screw-threaded piston which is reciprocated by the rotation of a hand wheel are the devices usually employed to compress the fluid contained in the passages connecting said gage with said cylinder, but these devices are both necessarily very slow and as the weights increase to correspond with the pressure of the gage the amount of labor required to lift said weights by compressing the fluid in said connecting passages will be correspondingly increased. After the testing of the master gage has been completed other gages to be tested are connected with the fluid compressing means permitting intercommunication of said fluid therethrough. Pressure is then applied to said fluid by means of said pump or screw-piston, while the hands of said gages are adjusted to correspond with the hand of the master gage. This is a long and tedious process owing to the time consumed in operating the pump and pistons referred to.

The object of the present invention is to provide an apparatus which may be quickly operated to test a master gage after which any number of gages may be tested therefrom by the mere opening of a valve, thereby decreasing the amount of work for the operator, providing a much finer adjustment and control and permitting the operator to center his attention upon the hand of the master gage and the gage to be adjusted to correspond thereto.

The object of the invention is further to provide means adapted to automatically elevate the table supporting the several weights and to revolve said table to increase the sensitiveness thereof.

The invention consists in the combination and arrangement of parts whereby the above objects and certain other objects hereinafter appearing may be attained, as set forth in the following specification and particularly pointed out in the claims.

Referring to the drawings: Figure 1 is a sectional elevation of a device embodying my invention. Fig. 2 is a section, partly in elevation, of the controlling valve therefor. Fig. 3 is a section taken on line 3—3 of Fig. 2.

Like numerals refer to like parts throughout the several views of the drawings.

In the drawings, 5 and 6 are gages, one of which may be a master gage by which the other is to be set or both of said gages may be untested gages which are about to be tested by the apparatus, both however are supported by nipples 7 having shut off valves 8. These nipples are supported in bases 9 provided with fluid passages 10 which are connected preferably by a pipe 11, thus permitting intercommunication therebetween.

A pipe 12 connects said bases 9 with instrumentalities adapted to force the fluid into said passages 10 and into said gages, said instrumentalities consisting of a cylinder 13. A piston 14 is arranged to reciprocate in said cylinder and to said piston is secured a plunger 15 which extends through an opening 16 in one end of said cylinder 13 and into a secondary cylinder 17, which is substantially smaller in cross sectional area than is the cylinder 13.

The cylinder 17 is detachably secured to the cylinder 13 by a union 18, while the opposite end of said secondary cylinder 17 is secured to a base 19 having a fluid passage 20 which communicates with the pipe 12 with provisions for other connections at 21, if desired. A fluid pipe 22 having terminals 23 and 24 connected at opposite ends of said cylinder 13 is adapted to supply fluid, such for instance, as compressed air through one or the other of the ports 25 or 26 to said cylinder, while to regulate the amount of air entering said ports I have provided a valve 27 which connects said terminals 23 and 24 to said pipe 22. By permitting compressed air to enter said cylinder 13 at one side or the other of the piston 14, said piston will be moved longitudinally of said cylinder and by said movement the air upon the opposite side thereof must be permitted to escape and for this purpose an exhaust pipe 28 is connected to said valve 27, while said valve is so constructed that when it is operated to permit compressed air to enter one of the ports in said cylinder through one of said terminals, the other of said terminals will be connected directly to said exhaust pipe 28, thus permitting the escape of said air and an uninterrupted movement of said piston.

In Figs. 2 and 3 I have illustrated in section the preferred form of valve for accomplishing the results just mentioned, which consists of a casing 29 provided with a tapering chamber 30 in which a rotary member 31 is arranged. A spring 32 yieldingly retains said member 31 in contact with the walls of the chamber 30, said spring engaging a cap 33 which is secured to the casing 29. The casing 29 is furthermore provided with four ports 34, 35, 36 and 37 which are preferably arranged 90° apart, said ports alining with the pipes 22, 23, 28 and 24 respectively. The rotary member 31 is recessed upon opposite sides at 38 and 39 and has a passage 40 extending transversely thereof between said recesses 38 and 39, while an outlet 41 extends from the recess 39 into said rotary member 31 and intersects the passage 40. When said rotary member is turned in the position illustrated in Fig. 3 the recess 38 extends from the port 34 to the port 35 thus connecting said ports, while the recess 39 extends from the port 36 to the port 37. In this way the compressed air or fluid will be permitted to enter through the pipe 22, recess 38 and pipe 23 to the upper end of the cylinder 13 and force said piston to the lower end thereof, while the air which remains in said cylinder will be forced therefrom by the movement of said piston through the pipe 24, recess 39 and exhaust pipe 28. To reverse the movement of said piston the rotary member 31 may be turned to the position illustrated in dotted lines Fig. 3 whereby the terminal 24 will be connected directly to the supply pipe 22 and the terminal 23 will be connected to the exhaust pipe 28. When it is desired to neutralize the pressure in opposite ends of said cylinder 13 the member 31 is rotated until the passage 40 connects the ports 35 and 37, or the pipes 23 and 24 whereupon the air contained in either end of said cylinder may escape through said passage 40 and passage 41 and port 36.

The device hereinbefore described is adapted to test gages to correspond with a master gage, but for the purpose of testing said master gage a device known as a dead weight tester is connected with the apparatus referred to and consists of a base 42 provided with a fluid passage 43 which has intercommunication with the passages 10 and 20 preferably by means of a pipe 44. A standard 45 is mounted upon said base and constitutes a cylinder which may be closed from the passage 43 by means of a valve 46. A plunger 47 is arranged to reciprocate in said cylinder, which at its upper end is provided with a table 48 adapted to support a plurality of weights 49, each of said weights preferably representing five pounds as registered on the dial of the gages 5 and 6, consequently to test each additional five pounds on said gage an additional weight has to be added. It will be readily seen that the plunger 47 is adapted to move downwardly in said cylinder 45 until said plunger is stopped either by the top of the standard 45 or against the valve 46.

As hereinbefore stated, the passages 10, 20 and 43 and the cylinder 45 are adapted to contain fluid which has inter-communication with all of said passages and when pressure is applied at any portion thereof it will be felt throughout the extent of the system, that is to say, should the plunger 15 be moved downwardly in the cylinder 17 the fluid contained in said cylinder will be ejected therefrom into the intercommunicating passages referred to with the result that the plunger 47 will be moved upwardly in the cylinder 45 until said piston is floated or supported solely by said fluid. At this time the pressure on the surface of said fluid at each of the gages 5 and 6 will correspond with the number of weights supported by said plunger 47 and therefore the hand may be adjusted to register with the graduations on the face of said gage which correspond to said weights. Another weight is then added with the result that the plunger 47 is caused to descend and again contact with the valve 46, whereupon more fluid must be forced into said intercommunicating passages and chambers to counteract said added weight and so on as each new weight is applied to said table. This may be accomplished by the admission of fluid to the cylinder 13 against the piston 14 by means of the valve 27, if desired, each time however this is done the operator has to rotate the handle 50 of said valve which would require considerable time and annoyance and to overcome this annoyance automatic means have been provided for admitting fluid to said cylinder 13, said automatic means being rendered effective by the downward movement of said weights 49 and table 48 and consist, preferably of a lever 51 pivoted at 52 to an arm 53 secured to the standard 45.

A roll 54 is adapted to be engaged by the under face 48 when said table is lowered by an additional weight. The outer end of the lever 51 is connected by a link 55 to a valve 56 connected with a pipe 57 constituting a by-pass for the supply pipe 22, thus as said lever 51 is rocked by said weights the valve 56 will be raised from its seat 58 permitting fluid to pass from the pipe 22 through the pipe 27 and pipes 57 and 23 into the cylinder 13 against the piston 14, thus causing said piston to move downwardly in said cylinder to eject more of the fluid contained in the cylinder 17 into the intercommunicating passages or especially into the cylinder 45, thus counteracting the movement of said weights by causing said piston 47 to move upwardly.

It is essential during the operation of the dead weight tester that the table 48 be rotated for by so doing the plunger 47 will be more sensitive and consequently move upward more readily than would be the case were it stationary and for this purpose fins 59 are formed about the periphery of said table and against said fins is directed a jet of fluid from a nozzle 60 which is connected to the supply pipe 22. After one of the gages has been tested by means of said dead weight tester the piston 14 is returned to its uppermost position in the cylinder 13 preferably by the operating of the handle 50 to connect the pipe 22 with the pipe 24 whereby fluid may be conducted into the cylinder 13 beneath the piston 14, while the pipe 23 is connected with the exhaust pipe 28, thus permitting the fluid contained in said cylinder above said piston to be discharged. After this has been accomplished the dead weight tester is rendered inoperative by rotating the valve 46 to close the passage therein and after this has been accomplished other gages may be attached to the gage nipple 7 and each tested by the ejection of the fluid from the cylinder 17 by said piston 14 and plunger 15, and adjusted to correspond to said master gage. By employing a piston of large diameter, such as 14, to operate the plunger 15, which is of relatively smaller diameter, it will be obvious that the pressure upon the fluid in the intercommunicating chambers or passages will be considerable, although the pressure of the fluid entering the cylinder 13 may be comparatively low, consequently gages and valves constructed to indicate high or low pressures may be tested by the same apparatus.

In the foregoing description it has been stated that compressed air is the preferred power for operating the piston 14, although I do not wish to be understood as limiting the apparatus to the use of this particular fluid, as a vacuum may be employed, if desired, by merely reversing the action of the valve 27, or steam or water may also be employed without departing from the spirit of the invention. It will also be obvious that the apparatus is capable of testing devices other than gages as, for instance, boilers may be connected to the nipples 7, if desired, or safety valves may be tested thereby.

Having thus described my invention what I claim and desire by Letters Patent to secure is:

1. An apparatus of the class described having, in combination, a gage supporting base, a standard provided with a cylinder having intercommunication with said gage supporting base, a plunger adapted to reciprocate in said cylinder, a table carried by said plunger adapted to support a plurality of weights, means to rotate said plunger in said cylinder, instrumentalities adapted to force fluid into said cylinder to elevate said plunger and table, and means to automatically retain said table in its elevated position.

2. An apparatus of the class described having, in combination, a cylinder, a piston arranged to reciprocate within said cylinder, a fluid pipe connected with said cylinder, a valve connected with said pipe adapted to regulate the movements of said piston, a secondary cylinder adapted to contain fluid, a plunger secured to said piston and projecting into said secondary cylinder adapted to be operated by said piston to eject said fluid therefrom, a gage support, a third cylinder having intercommunication with said secondary cylinder and said gage support, a plunger arranged in said third cylinder adapted to support a plurality of weights and to be elevated by the ejection of fluid from said secondary cylinder into said third cylinder, and means rendered effective by a downward movement of said weights adapted to automatically operate said valve.

3. In combination a cylinder, a piston arranged to reciprocate in said cylinder, a secondary cylinder substantially smaller in cross sectional area than said cylinder adapted to contain fluid, a plunger operatively connected with said piston adapted to be moved thereby to eject fluid from said secondary cylinder, a gage having intercommunication with said secondary cylinder, a third cylinder also having intercommunication with said cylinder and said gages, a plunger arranged in said third cylinder adapted to support weights, said plunger adapted to be floated by the ejection of fluid from said secondary cylinder into said third cylinder, a fluid pipe connected with said cylinder, a valve adapted to admit a predetermined amount of fluid into said cylinder to move said piston, a by-pass in said fluid pipe, a valve in said by-pass, and means automatically operated by the downward movement of said weights adapted to open said valve to admit fluid to said cylinder to counteract the downward movement of said weights.

4. An apparatus of the class described having, in combination, a gage supporting base, a standard provided with a cylinder having intercommunication with said gage supporting base, a plunger adapted to reciprocate in said cylinder, a series of weights carried by said plunger, means to automatically rotate said plunger in said cylinder, and instrumentalities adapted to force fluid into said cylinder to elevate said plunger.

5. An apparatus of the class described having, in combination, a gage supporting base, a standard provided with a cylinder having intercommunication with said gage supporting base, a plunger adapted to reciprocate in said cylinder, a plurality of weights carried by said plunger, instrumentalities adapted to force fluid into said cylinder to elevate said plunger, and means to automatically operate said instrumentalities to maintain said plunger in a predetermined position.

In testimony whereof I have hereunto set my hand in presence of two subscribing witnesses.

AUSTIN B. COLLETTE.

Witnesses:
SYDNEY E. TAFT,
LEONARD A. POWELL.

Copies of this patent may be obtained for five cents each, by addressing the "Commissioner of Patents, Washington, D. C."